United States Patent [19]
Strehlau et al.

[11] Patent Number: 6,089,015
[45] Date of Patent: Jul. 18, 2000

[54] METHOD OF PURIFYING A LEAN EXHAUST GAS AND CATALYTIC SYSTEM THEREFOR

[75] Inventors: Wolfgang Strehlau, Grosskrotzenburg; Egbert Lox, Hanau; Thomas Kreuzer, Karben; Jürgen Höhne, Hanau, all of Germany

[73] Assignee: Degussa-Hüls Aktiengesellschaft, Frankfurt, Germany

[21] Appl. No.: 09/078,415

[22] Filed: May 14, 1998

[30] Foreign Application Priority Data

May 21, 1997 [DE] Germany .................... 197 21 440

[51] Int. Cl.⁷ .................................................. F01N 3/00
[52] U.S. Cl. .................. 60/274; 60/301; 60/284; 60/302; 423/213.2; 423/213.5
[58] Field of Search .............. 60/274, 301, 302, 60/299, 284; 423/212, 213.2, 213.5

[56] References Cited

U.S. PATENT DOCUMENTS

| | | | |
|---|---|---|---|
| 4,094,821 | 6/1978 | McVicker et al. | 252/466 |
| 5,116,586 | 5/1992 | Baacke et al. . | |
| 5,326,735 | 7/1994 | Itoh et al. . | |
| 5,586,433 | 12/1996 | Boegner et al. . | |
| 5,600,949 | 2/1997 | Kato et al. | 60/284 |
| 5,611,198 | 3/1997 | Lane et al. . | |
| 5,628,186 | 5/1997 | Schmelz . | |
| 5,653,101 | 8/1997 | Lane et al. . | |
| 5,653,105 | 8/1997 | Noirot et al. | 60/297 |
| 5,709,080 | 1/1998 | Arora et al. . | |
| 5,723,404 | 3/1998 | Bütje et al. . | |
| 5,727,385 | 3/1998 | Hepburn et al. | 60/297 |
| 5,740,669 | 4/1998 | Kinugasa et al. | 60/285 |
| 5,746,052 | 5/1998 | Kinugasa et al. | 60/274 |
| 5,783,160 | 7/1998 | Kinugasa et al. | 423/237 |
| 5,797,263 | 8/1998 | Mirishima et al. | 60/311 |

FOREIGN PATENT DOCUMENTS

| | | |
|---|---|---|
| 0541271A1 | 5/1993 | European Pat. Off. . |
| 0627548A1 | 12/1994 | European Pat. Off. . |
| 0664147A2 | 7/1995 | European Pat. Off. . |
| 0730900A1 | 9/1996 | European Pat. Off. . |
| 0764459A2 | 3/1997 | European Pat. Off. . |
| 0764460A2 | 3/1997 | European Pat. Off. . |
| 0778072A2 | 6/1997 | European Pat. Off. . |
| 09000881A | 1/1997 | Japan . |
| WO 96/17671 | 6/1996 | WIPO . |

*Primary Examiner*—Thomas Denion
*Assistant Examiner*—Binh Tran
*Attorney, Agent, or Firm*—Smith Gambrell & Russell, LLP

[57] ABSTRACT

A method of purifying the lean exhaust gas of lean mix engines or diesel engines. The exhaust gas is first contacted with a permanent reduction catalyst and subsequently contacted with a nitrogen oxide storage catalyst. This procedure yields a uniformly good conversion of pollutants of the exhaust gases under differing operating conditions both as regards the air ratios and the exhaust gas temperatures.

12 Claims, 1 Drawing Sheet

METHOD OF PURIFYING A LEAN EXHAUST GAS AND CATALYTIC SYSTEM THEREFOR

INTRODUCTION AND BACKGROUND

The present invention relates to a method of purifying lean exhaust gas from internal combustion engines and a catalytic system to accomplish this end.

The exhaust gases from internal combustion engines contain carbon monoxide CO, unburned hydrocarbons HC, nitrogen oxides $NO_x$, and particles. The relative pollutant amounts and the content of residual oxygen vary in accordance with the type of internal combustion engine. A distinction is made, depending on the oxygen content, between rich exhaust gas, stoichiometrically composed exhaust gas and lean exhaust gas. Stoichiometric exhaust gas is present when the reducing and oxidizing portions of the exhaust gas make possible a complete reaction of the pollutants to form the harmless components water, carbon dioxide and nitrogen. The reducing components (hydrocarbons and carbon monoxide) predominate in rich exhaust gas and the oxidizing components (oxygen) in lean exhaust gas. The air ratio $\lambda$ is used as the coefficient of measure for the composition of the exhaust gas. The air ratio $\lambda$ concerns the air/fuel ratio standardized to stoichiometric conditions. The air/fuel ratio indicates how many kilograms air are required for the complete combustion of one kilogram fuel. In the case of conventional internal combustion engine fuels the stoichiometric air/fuel ratio is approximately 14.6.

Stoichiometric conditions are present at air ratios of $\lambda=1$. Values below 1 characterize a rich exhaust gas and values above 1 a lean exhaust gas.

In conventional internal combustion engines the oxygen content in the exhaust gas is regulated with the aid of a so-called lambda probe in such a manner that stoichiometric conditions ($\lambda=1$) are present. This corresponds to an oxygen content of the exhaust gas of approximately 0.5% by volume. However, the lambda regulation does not exclude periodic fluctuations of the air ratio above and below the stoichiometric value.

In order to reduce the fuel consumption of internal combustion engines so-called lean mix engines were developed which have a lean exhaust gas with air ratios of above 1.3. There are lean mix engines with a constantly lean exhaust gas and lean mix engines which alternate, for example, during acceleration phases into the rich exhaust gas range. Even diesel engines operate during their main operating time with a lean exhaust gas containing 6 to 10% by volume oxygen.

Lean mix engines have a high potential for reducing fuel consumption. This is especially true for direct injection lean mix engines, which theoretically make possible a reduction in consumption of up to 25% compared to internal combustion engines in stoichiometric operation.

The differing exhaust gas composition of the different engine types requires specially developed concepts for purifying exhaust gas. The exhaust gas of stoichiometrically operated internal combustion engines is purified with so-called three-way catalytic converters. These catalytic converters are capable of converting the three pollutants; namely, carbon monoxide, hydrocarbons and nitrogen oxides, under stoichiometric exhaust gas conditions almost quantitatively to water, carbon dioxide and nitrogen.

On the other hand, the purification of exhaust gas from lean mix engines and diesel engines still entails significant problems. Whereas the oxidizable components of lean exhaust gas can be converted relatively easily with oxidation type catalytic converters, the reduction of nitrogen oxides requires special reduction catalysts. These so-called DENOX catalysts reduce the nitrogen oxides while using the hydrocarbons and carbon monoxide contained in the exhaust gas as reducing agents. DENOX catalysts are well known in the art as shown, for example, in U.S. Pat. Nos. 5,723,404; 5,709,080; 5,653,101; 5,586,433; 5,628,186 and 5,611,198. If there are insufficient reducing agents present in the exhaust gas, appropriate amounts of reducing agents must be added to the exhaust gas before the exhaust gas contacts with the reducing catalyst. This can be in the form of e.g. nonburned fuel or ammonia. Given the prerequisite of a sufficient supply with reducing agent, the DENOX catalysts continuously convert the nitrogen oxides and are therefore designated herein as permanent reduction catalysts also.

The conversion rates of a catalyst for the individual pollutant components are heavily dependent on the temperature of the exhaust gas. As the temperature of the exhaust gas rises, the oxidation of the hydrocarbons and carbon monoxide begins at first and achieves oxidation rates of above 90% within a temperature interval of approximately 150 to 175° C. As the temperature increases further the conversion of the hydrocarbons remains constant. The exhaust gas temperature at which a conversion rate of 50% for the particular pollutant is achieved is designated as the light-off temperature for this pollutant.

The conversion rate of the permanent reduction catalysts for nitrogen oxides follows the conversion rate of the hydrocarbons. However, it does not rise monotonously but rather passes a maximum at temperatures at which the oxidation of the hydrocarbons has approximately reached its maximum value and then falls back to almost zero as the temperature rises. Optimal conversion rates for the nitrogen oxides are therefore only reached within a narrow temperature window. The maximum conversion rates for the nitrogen oxides are, depending on the amount ratio of hydrocarbons to nitrogen oxides in the exhaust gas ($HC/NO_x$ ratio), approximately 50 to 70% and thus in general clearly below those for the other pollutants in automobile exhaust gas.

The conversion curves for the individual pollutants are a function of the formulation of the particular catalyst. This also applies to the nitrogen oxides: position and width of the temperature window as well as the maximum degree of conversion which can be achieved in this window are determined by the catalytic formulation. So-called low temperature reduction catalysts are known which reach their maximum conversion of nitrogen oxide at temperatures between 150 and 250° C. In the case of high temperature reduction catalysts the maximum for nitrogen oxide conversion is above 300° C.

A typical representative of a low temperature reduction catalyst is disclosed in DE 196 14 540, which corresponds to U.S. application Ser. No. 08/838,846 which is relied on and incorporated herein by reference. It has a temperature window between 150 and 300° C.

DE 38 41 990 C2 corresponding to U.S. Pat. No. 5,116, 586 which is relied on and incorporated herein by reference describes a high temperature reduction catalyst for the selective reduction of nitrogen oxides in flue gases with the aid of ammonia. The catalyst consists essentially of a zeolite of the mordenite type exchanged with at least one of iron and copper and has optimum conversion rates for the nitrogen oxides between 350 and 500° C.

U.S. Pat. No. 5,185,305 which is relied on and incorporated herein by reference describes a zeolite ZSM5 exchanged with copper for purifying the exhaust gases of a lean mix engine.

EP 0,577,879 B1 corresponding to U.S. Pat. No. 5,326, 735 which is relied on and incorporated herein by reference describes another high temperature reduction catalyst. It relates to a catalyst of iridium in the metallic state or of an oxide or a mixture of the latter on a carrier of metal carbides or metal nitrides. The amount of iridium on the carrier is 0.005 to 10.0% by weight based on the total amount of the iridium and of the carrier. This catalyst reaches its maximum nitrogen oxide conversion at approximately 450° C.

In order to widen the temperature window for the reduction of nitrogen oxide a low and a high temperature reduction catalyst are connected in series according to DE 40 32 085 A1 which is relied on and incorporated herein by reference. However, the activity and the selectivity of two series connected permanent reduction catalysts are insufficient. In particular, the pollutant conversion of permanent reduction catalysts during short time, stoichiometric exhaust gas conditions is deficient compared to conventional three-way catalytic converters.

Therefore nitrogen oxide storage catalysts were developed especially for purifying the exhaust gas of lean mix engines (e.g. EP 0,562,516 A1 which is relied on and incorporated herein by reference) which store the nitrogen oxides as nitrates on alkali or alkaline earth elements under an excess of oxygen ($\lambda>1$) and reduce them to elementary nitrogen upon enrichment of the exhaust gas ($\lambda<1$). The enrichments necessary for this, in the case of which high concentrations of reducing agents are made available with an oxygen content which is sharply decreased at the same time, occur either in acceleration phases in which high loads and speeds are required or must be performed in the lean partial load operation by the engine electronics in precisely calculated time intervals in the form of short, periodic enrichment peaks ($\lambda<1$). The latter requires a complicated control concept for the engine and a very precise coordination of the vehicle operation with the catalytic converter. Furthermore, it is disadvantageous that the periodic enrichment phases for the regeneration of the storage catalyst result in an increased fuel consumption which reduces the fuel savings achievable with lean mix engines.

Compared to the permanent reduction catalysts, which continuously convert the nitrogen oxides under lean exhaust gas conditions, this takes place in storage catalysts only during the periodic enrichment phases.

Nitrogen oxide storage catalysts generally operate efficiently in a temperature range of 200 to 500° C. In addition to their good storage capacity for nitrogen oxide in lean exhaust gas, nitrogen oxide storage catalysts also have good conversion rates for all three pollutant types during stoichiometric operation of the lean mix engine which approach those of conventional three-way catalytic converters.

Certain limiting values have been set for the admissible pollutant emissions of motor vehicles. The emissions of motor vehicles are determined during legally prescribed operating cycles. For example, in Europe the MVEG-A cycle was set by the European Commission. According to the currently valid limiting values a vehicle with an internal combustion engine must not emit more than 2.7 g CO/km, not more than 0.34 g HC/km and not more than 0.25 g $NO_x$/km during the MVEG-A cycle. There are separate limiting values for diesel engines. Further refinements of the limiting values for internal combustion engines and diesel engines are planned for 1999 and 2005 which approximately halve the currently valid limiting values.

The known purification methods of exhaust gas for lean exhaust gas compositions on the basis of permanent reduction catalysts are not capable of meeting the future limiting values for exhaust gases. In the instance of storage catalysts an additional consumption of fuel for the regeneration of their storage capacity must be accepted on account of the periodic enrichments which consumption reduces the theoretical savings potential of lean mix engines. In addition, a purification method using storage catalysts requires a complicated engine control system which must calculate the duration of the enrichment phases and carry out the enrichment phases.

An object of the present invention therefore is to improve the method of purifying lean exhaust gas. Another object is to largely avoid the fuel consumption of storage catalysts occasioned by the periodic enrichment phases.

SUMMARY OF THE INVENTION

The above and other objects of the invention can be achieved by first contacting the exhaust gas with a permanent reduction catalyst and thereafter contacting the exhaust gas stream with a nitrogen oxide storage catalyst. The exhaust stream is therefore treated in two steps, where the reduction catalyst is located upstream from the nitrogen oxide storage catalyst in series. This connecting in series of the two catalysts has the advantage that the leakage of more than 30% of the nitrogen oxides, which is always present even in the case of good permanent reduction catalysts, is caught by the downstream nitrogen oxide storage catalyst. However, since this involves only a part of the total nitrogen oxide freight of the exhaust gas, the storage capacity of the storage catalyst is relieved, so that it can be regenerated less frequently by enriching of the exhaust gas. This effect results in a reduced fuel consumption as a consequence. During normal inner city vehicle operation the enrichment phases can even be largely eliminated since the richer exhaust gas mixture during the constantly reoccurring acceleration phases is completely sufficient for this. During constant lean operation in the partial load range the light-off temperature of the permanent reduction catalyst is exceeded. This then assures to a great extent the conversion of the nitrogen oxides by itself. The frequency of the periodic enrichment phases for the regeneration of the storage catalyst can be correspondingly reduced or the enrichments can even be entirely eliminated.

Therefore, the permanent reduction catalyst and the nitrogen oxide storage catalyst complement one another in their catalytic actions. This also holds true for operating phases of the lean mix engine with stoichiometric exhaust gas conditions. Among these conditions permanent reduction catalysts have only a deficient conversion of pollutants whereas storage catalysts still have a good three-way activity at $\lambda=1$.

BRIEF DESCRIPTION OF DRAWINGS

The present invention will be further understood with reference to FIG. 1 which is a schematic representation of the exhaust gas purification system of the invention.

DETAILED DESCRIPTION OF INVENTION

Figure 1:
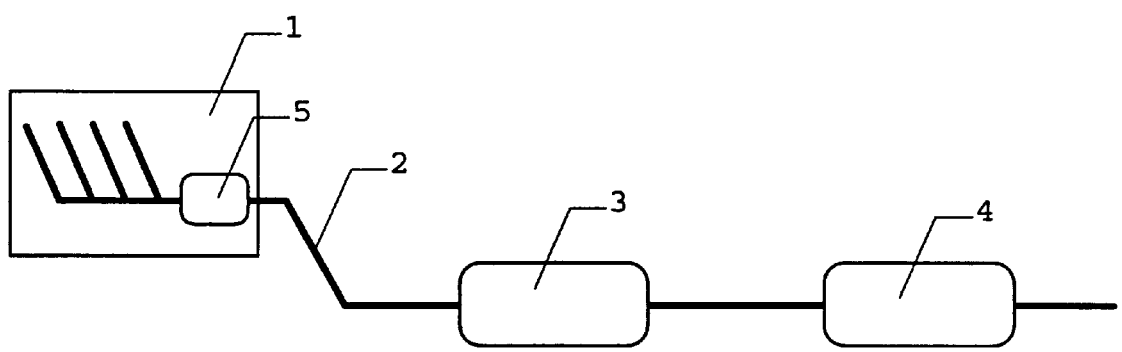

Further details of the present invention will now be described.

The known storage catalysts operate optimally in a temperature range between 200 and 450° C. By selecting a permanent reduction catalyst with a temperature window for the reduction of nitrogen oxide between 300 and 600° C. the temperature window for the entire system can therefore be expanded to the range between 200 and 600° C. The use of an iridium catalyst as permanent reduction catalyst for the nitrogen oxides is particularly suitable to this end. Alternatively, a ZSM-5 zeolite catalyst exchanged with copper can also be used.

A further improvement of the conversion of pollutants can be achieved if a three-way catalytic converter with small dimensions and close to the engine is connected in front of the permanent reduction catalyst in order to convert carbon monoxide, hydrocarbons and nitrogen oxides in the cold start phase of the vehicle. The activity of this catalyst should be low since it must still allow sufficient leakage of hydrocarbons and carbon monoxide as reducing agents for the permanent reduction catalyst connected downstream after the operating temperature has been reached.

FIG. 1 shows the schematic design of a exhaust gas purification system suitable for the method of the invention. Lean mix engine 1 is provided with exhaust gas system 2 comprising two converters 3 and 4. Converter 3 contains a permanent reduction catalyst whereas converter 4 contains the nitrogen oxide storage catalyst.

In principle, both catalysts can be housed in a converter housing. However, the housing in two separate converter housings shown in FIG. 1 makes it possible to control the exhaust gas temperature on the storage catalyst during the predominant duration of operation into a temperature range favorable for the storage catalyst. This can take place in a simple manner by adapting the exhaust gas line between the two converter housings, since according to the invention the exhaust gas cools off by approximately 50 to 100° C. per meter of line length when flowing through the exhaust gas line.

Converter housing 5 is arranged close to the engine and upstream from converter 3 and contains an optional pre-catalyst for improving the cold start properties of the exhaust gas purification system.

In principle both types of catalyst—carrier catalyst and pellet catalyst can be used. The preferred catalyst type is the carrier catalyst which consists of a catalytic coating on an inert honeycomb carrier. As an alternative, the catalytic material may also be extruded into a honeycomb body. In this case the honeycomb body consists entirely of catalytic material. No separate coating has to be applied. Chemical composition of the catalyst:

a) Permanent reduction catalyst:

according to DE 196 14 540

The catalyst comprises at least one zeolite and at least one platinum group metal, at least one metal oxide selected from the group consisting of aluminum silicate, aluminum oxide and titanium oxide, wherein the aluminum silicate has a ratio by weight of silicon dioxide to aluminum oxide of 0.005 to 1 and the platinum group metals are deposited on only said metal oxide. By platinum group metal is meant a metal selected from Group VII of the Periodic Table of Elements, e.g. platinum, palladium, rhodium and iridium.

according to U.S. Pat. No. 5,116,586

The catalyst comprises a zeolite of mordenite type and deposited thereon 0.2 to 5.2% by weight copper, 0.1 to 4.5% by weight iron and 0.1 to 1.0% by weight cerium relative to the zeolite weight.

according to EP 0 577 879B1

The catalyst consists of iridium in the state of metal or of an oxide or of a mixture of these, supported on a carrier selected from the group consisting of metal carbides and metal nitrides, wherein the amount of said supported iridium is from 0.005 to 10% by weight based on the total amount of the iridium and the carrier.

b) $No_x$-storage catalyst.

The catalyst according to EP 0 562 516 A1 comprises a carrier composed of a porous material, and barium oxide, lanthanum oxide and platinum supported on said carrier, at least part of said barium oxide and at least part of said lanthanum oxide forming a composite oxide.

A more general description is given in EP 0 560 991 B1. Accordingly the $No_x$-absorbent uses, for example, alumina as a carrier. On this carrier, at least one substance selected from alkali metals, for example, potassium K, sodium Na, lithium Li, and cerium Cs; alkali earth metals, for example, barium Ba and calcium Ca; rare earth metals, for example lanthanum La and yttrium Y; and precious metals such as platinum Pt, is deposited.

An example of a permanent reduction catalyst is a DENOX catalyst.

Further variations and modifications of the invention will be apparent to those skilled in the art from the foregoing and are intended to be encompassed by the claims appended hereto.

Germany priority application 197 21 440.1 is relied on and incorporated herein by reference.

What is claimed is:

1. A method of purifying lean exhaust gas, from a lean mix engine or a diesel engine, containing hydrocarbons, carbon monoxide and nitrogen oxides, the method comprising;

conducting said exhaust gas through a cold start, three-way pre-catalyst positioned close to the engine;

thereafter conducting said exhaust gas through a permanent reduction catalyst, thereby reducing nitrogen oxides with the aid of hydrocarbons and carbon monoxide as reducing agents; and thereafter conducting said exhaust gas through a nitrogen oxides storage catalyst, to trap residual nitrogen oxides leaking from the permanent reduction catalyst.

2. The method according to claim 1, wherein said permanent reduction catalyst comprises at least one member selected from the group consisting of an iridium containing catalyst and a copper containing zeolite catalyst.

3. The method according to claim 1, wherein said lean exhaust gas has an air ratio $\lambda$ of more than 1.3.

4. The method according to claim 1, wherein said permanent reduction catalyst is a DENOX catalyst.

5. The method according to claim 1, wherein said permanent reduction catalyst is a mordenite zeolite exchanged with at least one member selected from the group consisting of iron and copper.

6. The method according to claim 1, wherein said permanent reduction catalyst comprises zeolite ZSM5 exchanged with copper.

7. The method according to claim 1, wherein said permanent reduction catalyst is iridium as metal, oxide, or a mixture thereof, deposited on a metal carbide or metal nitride carrier.

8. The method according to claim 1, wherein said permanent reduction catalyst comprises at least one zeolite support having deposited thereon at least one metal oxide selected from the group consisting of aluminum silicate, aluminum oxide and titanium oxide, wherein the aluminum silicate has a weight ratio of silicon dioxide to aluminum oxide of 0.005 to 1 and at least one platinum group metal deposited on said metal oxide.

9. The method according to claim 1, wherein said nitrogen oxide storage catalyst is a carrier of a porous material having deposited thereon barium oxide and lanthanum oxide as a support, and a platinum group metal deposited on said support, wherein at least part of said barium oxide and said lanthanum oxide form a composite oxide.

10. The method according to claim 1, wherein said nitrogen oxide storage catalyst comprises a carrier of alumina having deposited thereon a support selected from the group consisting of an alkali metal, an alkaline earth metal and a rare earth element, and a platinum group metal deposited on said support.

11. A catalytic system for carrying out the method according to claim 1, comprising a plurality of catalysts connected in series, and a pre-catalyst connected upstream from said plurality of catalysts and close to the engine, which catalysts connected in series comprise a permanent reduction catalyst and a nitrogen oxide storage catalyst, said permanent reduction catalyst being located upstream from said nitrogen oxide storage catalyst.

12. The catalytic system according to claim 11, wherein said permanent reduction catalyst is a DENOX catalyst.

\* \* \* \* \*